United States Patent [19]

Wendell

[11] 4,334,334
[45] Jun. 15, 1982

[54] THREAD CLEANING DEVICE

[76] Inventor: David E. Wendell, 118 Warwick Dr., #58, Benicia, Calif. 94510

[21] Appl. No.: 182,014

[22] Filed: Aug. 28, 1980

Related U.S. Application Data

[62] Division of Ser. No. 64,772, Aug. 8, 1979.

[51] Int. Cl.³ ............................................. B23G 5/00
[52] U.S. Cl. .................................... 15/236 R; 10/1 B
[58] Field of Search ............ 15/104.02, 104.03, 104.05, 15/104.09, 104.1 R, 236 R; 10/1 B, 141 R; 408/215; 72/392; 82/4 C

[56] References Cited

U.S. PATENT DOCUMENTS 2,267,166 12/1941 Petersen ..................... 10/141 R X
2,567,480 9/1951 Heldenbrand ..................... 10/1 B
2,787,010 4/1957 Uphoff ............................ 408/215

FOREIGN PATENT DOCUMENTS 627905 9/1961 Canada ............................... 10/1 B Primary Examiner—Edward L. Roberts
Attorney, Agent, or Firm—Kenneth H. Johnson

[57] ABSTRACT

A thermowell or the like is installed in a pipe or similar member without taking the member out of service by first welding an adapter to the surface of the member at the point where the thermowell is to be installed, connecting a gate valve and hot tapping machine to the adapter, drilling a hole in the member through the open gate valve, withdrawing the drill and closing the valve, replacing the drill in the hot tapping machine with the thermowell, opening the gate valve, and installing the thermowell through the open valve. The adapter having a taper internally threaded portion, distal from the ends of a conduit therethrough. A thread chaser or cleaning device to remove particles from the internal threads of the adapter is provided.

4 Claims, 5 Drawing Figures

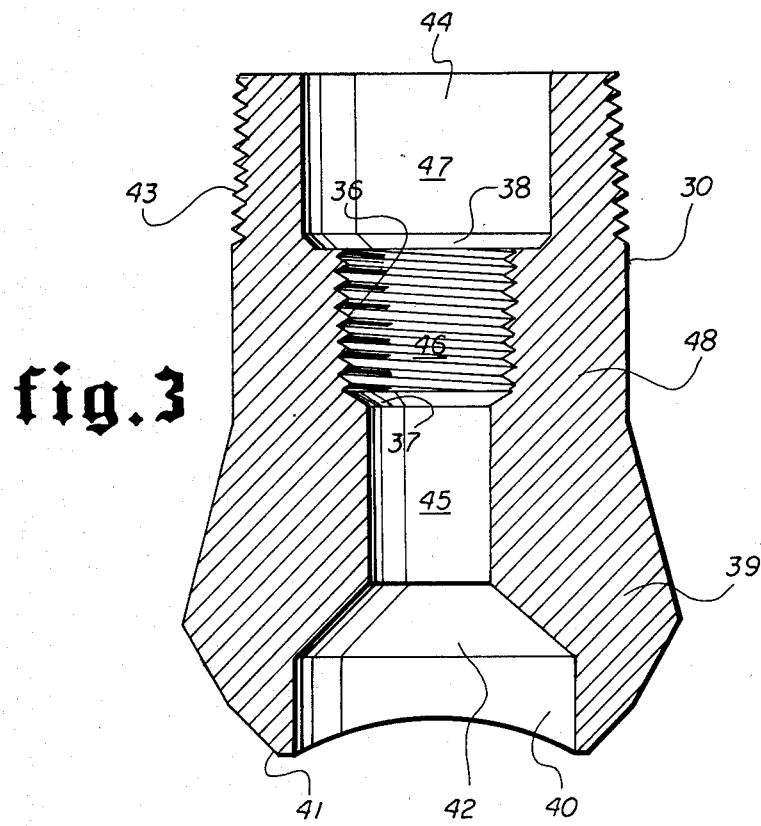
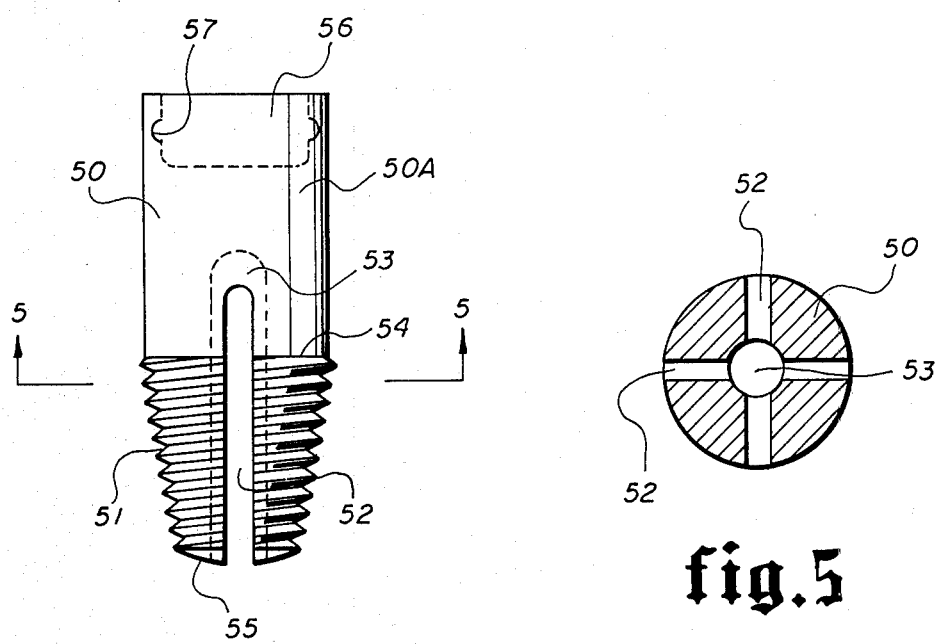

THREAD CLEANING DEVICE

This is a division, of application Ser. No. 064,772 filed Aug. 8, 1979.

BACKGROUND OF THE INVENTION

1. Field of the Invention

This invention relates to equipment for installing thermowells and similar devices in pipelines and other members and it particularly relates to a method and apparatus for the installation of thermowells, corrosion probes, injection nozzles, sampling taps and the like in pipelines and similar members without taking such members out of service.

2. Background of the Invention

Hot tapping machines are frequently used to permit the cutting of holes in pipes and similar members containing fluids under pressure. Such a machine normally consists of an elongated chamber containing an internal shaft to which a drill can be connected for rotary and longitudinal movement through a packing gland at the upper end of the chamber. The lower end of the chamber is threaded or fitted with a flange so that it can be connected to a fitting which is welded to the surface of a pipe or other member or in some cases clamped around it. This fitting will include a check or gate-type valve which can be opened at the beginning of the hot tapping operation and closed at the conclusion of the operation. This fitting is left in place after the opening in the pipe or other member has been cut. The fitting is quite expensive, generally over $1000 and the necessity to leave it placed has made hot tapping a costly operation.

The installation of a thermowell, test probe or similar device in a pipeline or other member during service normally requires hot tapping of the member as described above and insertion of the thermowell or other device through an elongated packing gland containing a series of packing rings by means of jacking screws. This procedure is time consuming and hazardous in that the packing rings may leak and permit the escape of high pressure fluids during the operation. If the pipe or other member contains flammable gases, a fire or explosion may result. Moreover, the force required to overcome the friction of the packing glands and internal pressure in the system may result in bending or damage to the thermowell or other device, preventing completion of the operation and necessitating shutdown of the system. Furthermore, if the hot tap is no longer needed the entire fitting had to be left in place. As a result of these and related difficulties, conventional methods and equipment for the installation of thermowells and similar devices in pipelines and other vessels containing fluids under pressure leave much to be desired.

SUMMARY OF THE INVENTION

The present invention provides an improved method and apparatus for the installation of thermowells, corrosion probes, injection nozzles, sample taps and similar devices in pipelines and other members containing fluids under pressure which largely eliminates the difficulties encountered with methods and apparatus employed in the past. The method of the invention involves the welding of a novel adapter containing a threaded connection and internal seat for the thermowell or other device to the surface of the pipe or other member at the point where the device is to be installed, the connection of a gate or other full opening valve to the upper end of the adapter, and the attachment of a hot tapping machine to the upper end of the valve. The hot tap machine comprises an elongated chamber of sufficient length to contain the drill bit and preferably the thermowell or other device to be installed in the line. Otherwise, such a chamber must be attached to the gate valve before the installation of the device. Once this has been done, the valve is opened and the hot tapping machine is used to drill a hole in the wall of the pipe or other member below the adapter. The hot tapping machine drill is then withdrawn to a point above the valve and the valve is closed to prevent the escape of fluid from the member. After this has been accomplished, the hot tapping machine is removed and the drill is replaced with a special socket drive and the thermowell or other device to be installed. In addition to drilling, grinding may be used to make the holes in the structure and the term "drill" as used herein, includes grinding. The grinding is advantageous where there may be sensitive equipment down stream from the hole, since grinding produces smaller particles than drilling with a bit. The smaller ground particles are easily carried away with any flow whereas the drilled particles can lodge in or catch on other equipment in the structure. This device will include an external threaded section for seating in the adapter and an internal threaded section for the installation of a plug if desired or in the case of the thermowell, a temperature sensing device may be installed. The thermocouple or other device is placed in elongated chamber and the special socket drive engaged in a corresponding socket in the thermocouple or other device. The valve is then opened and the hot tapping machine is used to lower the thermowell or other device through the valve and threaded into place in the adapter. Thereafter, the hot tapping machine can be withdrawn from the thermowall and the valve, chamber and hot tapping machine can be removed. The resulting thermowell occupies a minimum of space, does not require that a valve be left in place, and can be readily removed from the pipe or other member if this should become necessary. Simple modifications to the thermowell permit its use as a test well, an injection nozzle, a corrosion plug, a flow indicating device, or as a housing for a flow switch, densitometer, pig indicator, annubar, or the like.

The configuration and dimensions of the adapter employed for purposes of the invention will depend in part upon the size and shape of the pipe or other member to which it is to be attached. Normally, however, the adapter will have generally cylindrical cross sections shaped at the bottom to fit snugly against the surface of the pipe or other member preferably with an internal chamber abutting the pipe terminating in a frusto-conical section and beveled externally at the lower outer edge to facilitate its being welded in place. It will include an internal passageway or conduit connect from the frusto-conical section and containing a lower seat against which a lower shoulder on the thermowell or similar device abuts, an intermediate threaded section, an upper seat against which an upper shoulder on the device rests, and an enlarged upper section into which the upper part of the device fits. The upper end of the adapter will be threaded on its outer surface or provided with a flange or other means to permit attachment of the hot tapping machine and chamber during installation of the device and the connection in place of a cap or other closure following installation. Preferably the internally threaded portion of the adapter is not adjacent to the lower end thereof and the lower end although generally cylindrical is cross section is thickened. By spacing the internal thread away from the lower end and thickening the body of the adapter, a heat sink is provided, which will reduce or prevent distortion of the internal threads when the adapter is welded to the pipe.

The thermowell or similar device employed in conjunction with the adapter will normally be an elongated tapered member having upper and lower shoulders and an externally threaded intermediate section for seating in the adapter. It will include an opening in the upper end for accepting a rectangular or hexagonal drive member attached to the shaft of the hot tapping machine and below this may be hollow if it is to be used as a thermowell, test well or the like or solid if it is to be employed as a corrosion probe. Below the drive opening, an internally threaded section will normally be provided in devices intended for use other than a corrosion probe to permit the insertion of a threaded plug. The lower portion of the device may have a variety of different configurations, depending upon the particular use for which the device is intended.

The type of chamber, valve and other parts used in installing the thermowell or similar device will depend to a large extent upon the particular type of hot tapping machine employed. These may be provided with either threaded or flanged connections and may be varied in size, depending upon the size of the pipe or the like with which the apparatus is to be employed, the length of the thermowell or similar device to be installed, and the dimensions of the particular hot tapping machine to be used.

The method and apparatus of the invention have numerous advantages over conventional systems used in the past. The system of the invention permits the installation, while a pipeline or similar vessel is in service, of thermowells and other devices similar to those installed during the original construction, eliminates the need for jacking screws or other devices normally required to insert thermowells through packing rings or gland seals and does away with the necessity for such rings or seals. Because the thermowell does not need to extend through an isolation valve and packing when in place, it can be considerably shorter than the devices generally employed. The method and apparatus are considerably less expensive than systems currently in use since only the adapter and the thermowell or other device are left in place, and permit thermowell installation more rapidly than do conventional systems. There is little danger of fluid leakage or damage to the thermowell during installation and little chance of malfunctioning of the apparatus of the invention. Should a malfunction occur during installation, the work can be rapidly terminated with little danger and without necessity for shutting down the pipeline or other vessel. The installation equipment employed can be reused and need not be left in place. Thermowells and other devices installed in accordance with the invention can be readily removed or replaced as necessary. As a result of these and other advantages, the system of the invention has widespread potential application.

A related aspect of the present invention, is the thread chaser or cleaning device which is used to remove particles, which result from drilling or grinding, from the internal threads of the adapter.

The thread chaser comprises a body having means to attach to a drive shaft, a conical section having pipe threads thereover, a pair of intersecting slots extending through said conical section and dividing it into quadrants and preferably a bore extending along the axis of the intersection of said slots and exceeding the diameter of said intersection. Preferably, the slots are substantially the same size and length and intersect at right angles, with the slots extending at least the length of the conical section. That is, the slots preferably extend laterally and vertically through the conical section, cutting the cone into four equal sections extending from the upper part of the chaser body.

The slots and bore allow the threaded conical section to bend and follow the internal threads of the adapter. The threads on the chaser will correspond to the threads to be cleaned in the adapter. The thread chaser may be made of steel or plastic, and preferably it is magnetized to help capture some of the cuttings from the drilling or grinding operation. A plastic composition containing powdered iron as known in the art serves this function and is unlikely to damage the threads in the adapter.

BRIEF DESCRIPTION OF THE DRAWING

FIG. 3 shows an adapter according to the present invention in cross sectional elevation.

FIG. 4 shows an elevation of a thread chaser.

FIG. 5 shows a cross sectional view of the thread chaser along lines 5—5 of FIG. 4.

DETAILED DESCRIPTION AND PREFERRED EMBODIMENTS

Figure 1:
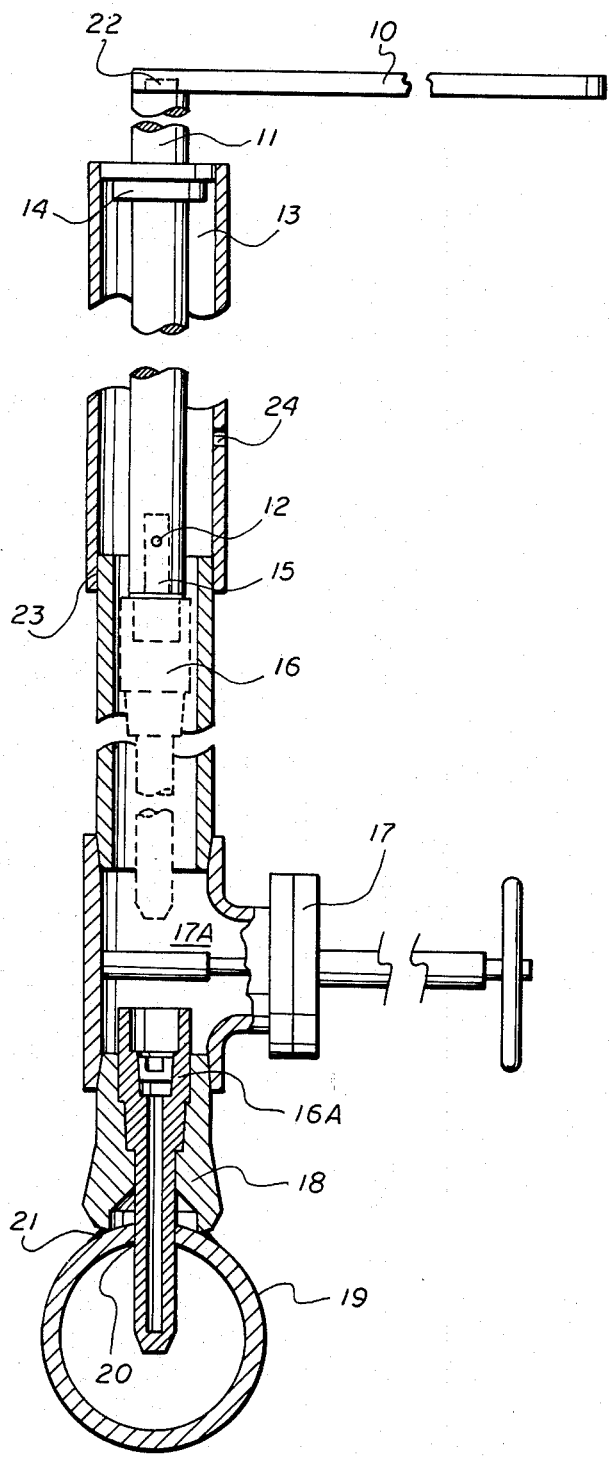
FIG. 1 is a vertical view, partially in section illustrating the installation of a thermowell in a pipeline in accordance with the invention.

FIG. 1 illustrates the apparatus used for boring the hole and for setting the device (a thermowell 16a in this case) in the adapter 18.

The adapter 18 is welded 21 to pipe 19. The gate valve 17 is attached to the adapter and chamber 13 composed of two joined sections is attached on top of the valve. The upper end of the chamber is closed and shaft 11 extends through seal 14 into the chamber. The shaft 11 is connected to handle 10 by sprocket 22. The shaft is movable both rectilinearly and rotationally.

Attached to shaft 11 by a pin 12 is sprocket device 15 which engages in a corresponding socket in thermowell 16, which is depicted in phantom outline showing it before being seated in the adapter 18. Thermowell 16a is shown seated in adapter 18 extending through hole 20 into pipe 19.

To explain how the thermowell came to be seated in the adapter, reference is again had to FIG. 1. In sequence, the steps of the process are:

1. Weld adapter 18 to pipe 19 (welds 21).

2. Attach gate valve 17 and chamber 17a in that order to the adapter 18.

3. Attach a drill bit (not shown) to shaft 11 in place of sprocket device 15. If the chamber 13 is composed of two sections as shown in FIG. 1, it is convenient to separate the section at 23 for changing the attachments to shaft 11 and inserting the device for installation in the adapter 18.

4. Passing the shaft and attach drill bit through open gate valve 17, through the adapter and onto the surface of pipe 19.

5. Rotating shaft to cause the drill bit to cut hole 20 in pipe 19. The bit could be rotated by hand; however, ordinarily a power source such as an air motor or electric motor would be connected to sprocket 22. The drill is sized to be slightly smaller than the smallest portion of the conduit (i.e., section 45) thereby providing a drill guide.

6. After the hole 20 is completed, the shaft and drill bit are raised above gate valve 17 and the valve is closed.

7. The chamber 13 is opened, e.g., at 23 and the drill bit removed and replaced with sprocket device 15 and the thermowell or other device 16 attached thereto and the chamber 13 closed. After the hole is drilled, it is preferable to clear the internal threads in adapter 18 with thread chasing or cleaning device.

8. The gate valve 17 is opened and the shaft, sprocket device and thermowell lowered to pass the thermowell through the adapter 18 into the pipe. The taper of the middle portion of the internal passage through the adapter as well as the chamber (bevelled surface 37 FIG. 2) aid in guiding the device 16a into the correct position.

9. The using the handle 10 the device 16a is screwed into the adapter forming a metal to metal seal by means of the taper of the threaded connecting portions.

10. The sprocket device is withdrawn and the hot tap portion and the valve removed from the adapter.

During those times in which the chamber 13 is subject to contact with the contents of the pipe 19, it is best to maintain a pressure in the chamber equal to or greater than that in the line. An inlet 24 is provided for this purpose. The gas is preferably an inert, such as nitrogen. The pressuring of the system will also show if the system has been properly prepared, hence avoiding an unexpected leak after the pipe is drilled.

The heart of the invention, i.e., that which makes the simplified process and reduced cost possible is the adapter. It can be readily appreciated as mentioned above that any number of useful devices can be inexpensively set in the adapter, once it is attached to the pipe or other member.

Figure 2:
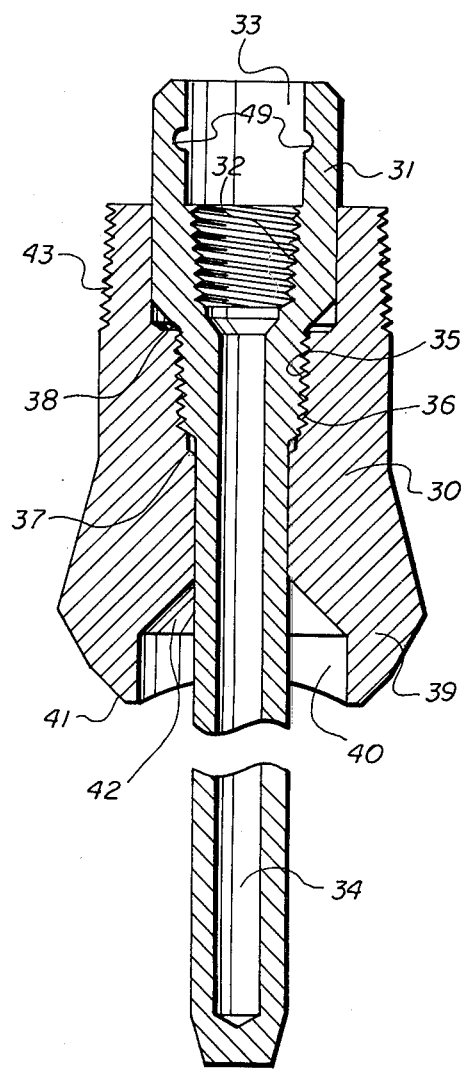
FIG. 2 depicts a finished thermowell installed in an adapter in accordance with the invention in cross sectional elevation.

FIG. 2 illustrates the adapter 30 in detail with a thermowell device 31 situated therein and FIG. 3 depicts the adapter 30 alone. The adapter comprises a body 48 having circular cross section and generally cylindrical shape although the diameter of the cross section may vary, and having an internal conduit extending therethrough along the central axis thereof. One end is adapted to be welded onto a pipe and has an externally bevelled surface 41 thereabout the opening. Extending inwardly from the bevelled end is an enlarged portion 40 of the internal conduit 44, which portion has a frusto-conical shape 42 on the interior section thereof. Frustoconical section 42 (a bevelled surface) connecter to a narrowed portion 45 of the conduit 44 which connects to an enlarged tapered section 46 having a bevelled surface 37, adjoining the narrowed portion 45, and having internal tapered thread 36. The bevelled surface 37 forms a first shoulder in section 46.

The body 48 preferably has a greater cross section in the area of the frusto-conical section 42 and the narrowed section 45. The enlarged chamber 44 is tapered down in diameter toward the bevelled surface 37. The tapered threaded surface when engaged with a device 31 by threads 35 thereon causes a metal to metal seal seating the device on the bevelled surface 37. Connecting to the enlarged end of tapered section 46 is the upper chamber 47 which is of larger cross section than tapered section chamber 46. There is a bevelled surface 38 in upper chamber 47 adjoining tapered section 46. Surface 38 insures self aligning with the external threads of thermowell which is also chamfered. The bevelled surface 38 forms a second shoulder in section 47. External of the adapter about upper chamber 47 means 43 are provided to attach a valve, which are threads in this embodiment, however a flange would work as well. The taper of chamber 46 and the chamber of bevelled surface 37 aid in positioning a device in the adapter.

The device 31 seated in adapter 30 may have a chamber 34 therein as in a thermowell with a socket 33 adapted to receive the sprocket device 15 and an internally threaded section 32 for inserting a cap or temperature measuring devices. A spring loaded ball plunger (not shown) on the sprocket device 15, engages in annular groove 49 in socket 33 or in similar grooves in other items fitted to the adapter 30, which prevents the item from falling off of the sprocket device 15, but allows withdrawal of the sprocket device once the item, for example, the thermowell 31, is threaded into adapter 30.

The frusto-conical section 42 provides an important function during the drilling of the hole in the pipe in that the cuttings made by the drill bit are wiped off and collected in chamber 40 and hence are not brought back up to the upper portion of the adapter 30 or into the valve or upper portion of the apparatus where they would be a problem in removal. In any event, it is the better practice after the hole is drilled in the pipe to attach a thread cleaning or chasing device to the shaft and to clean out the threads since even small drilled particles can cause an imperfect sealing between threads 36 and 37.

In an embodiment not shown and less preferred, the narrowed portion 45 of the internal conduit 44 may be omitted thereby bringing tapered section 46 and frusto-conical section 42 together. This embodiment is fully operable, however, the internal threads 36 are brought into closer proximity to bevelled surface 41 where the weld is to be made, which increases the likelihood of distortion of the threads from the welding.

The term "central axis" is used to mean the axis through the circular cross-sections of the adapter.

The thread chaser shown in FIG. 4, comprises a body 50 which has a cylindrical portion 50a and conical section 51. The taper of the conical section corresponds to the taper of the threads in the adapter to be cleaned. There is chamfer 55 about the distal end of the conical section which aids in aligning the chaser in the adapter. A pair of slots 52 extend through the conical section intersecting at right angles as shown in FIG. 5 creating four substantially equal quadrants. In addition to slots, a bore 53 extends along the axis of the slots intersection and slightly beyond into the body of the chaser. The slots and bore make the conical section bendable to accommodate to the threads in the adapter. The slots extend somewhat into cylindrical section 50a to allow flexibility in the entire conical section.

Over the surface of the conical sections 51 are machine threads 54 which are the same as those in the adapter and of course any thread desired may be employed.

At the end of the body 50 distal to the conical section, a socket 56 (phantom lines) is provided with an annular groover 57, to engage the sprocket device 15 as described above.

The invention claimed is:

1. A thread chaser comprising a solid body having:
   (a) a cylindrical portion which has means to attach to a drive shaft therein,
   (b) a conical section being distal to said drive shaft attaching means and having pipe threads thereover, a chamfer at the terminus thereof and at least one slot extending through said conical section and dividing said conical section.

2. The thread chaser according to claim 1 having a pair of intersecting slots extending through said conical section.

3. The thread chaser according to claim 2 having a bore extending along the intersection of said slots and exceeding the diameter of said intersection, said slots being substantially the same size and length and intersecting at right angles, thereby dividing the conical section into four equal sections.

4. The thread chaser according to claim 1 wherein said means to attach is a socket in the body having an annular groove therein.

* * * * *